United States Patent
Schuetzle et al.

(10) Patent No.: US 11,857,938 B2
(45) Date of Patent: Jan. 2, 2024

(54) SYSTEMS AND METHODS FOR CONTROLLING A POWER-TO-X PROCESS TO REDUCE FEEDSTOCK COSTS

(71) Applicant: INFINIUM TECHNOLOGY, LLC, Sacramento, CA (US)

(72) Inventors: Dennis Schuetzle, Grass Valley, CA (US); Robert Schuetzle, Sacramento, CA (US); Anja Rumplecker Galloway, San Rafael, CA (US); Glenn McGinnis, Sun Lakes, AZ (US); Alex Mattana, El Sobrante, CA (US)

(73) Assignee: Infinium Technology, LLC, Sacramento, CA (US)

( * ) Notice: Subject to any disclaimer, the term of this patent is extended or adjusted under 35 U.S.C. 154(b) by 0 days.

(21) Appl. No.: 17/300,821

(22) Filed: Nov. 16, 2021

(65) Prior Publication Data
US 2023/0149881 A1  May 18, 2023

(51) Int. Cl.
| | |
|---|---|
| B01J 19/00 | (2006.01) |
| C01B 32/40 | (2017.01) |
| C01B 3/36 | (2006.01) |
| C01B 3/56 | (2006.01) |
| C10G 2/00 | (2006.01) |
| C25B 1/04 | (2021.01) |
| C25B 15/08 | (2006.01) |
| C10L 1/04 | (2006.01) |

(52) U.S. Cl.
CPC ............. *B01J 19/0033* (2013.01); *C01B 3/36* (2013.01); *C01B 3/56* (2013.01); *C01B 32/40* (2017.08); *C10G 2/30* (2013.01); *C10L 1/04* (2013.01); *C25B 1/04* (2013.01); *C25B 15/081* (2021.01); *C01B 2203/0244* (2013.01); *C01B 2203/0283* (2013.01); *C01B 2203/062* (2013.01); *C10L 2290/42* (2013.01)

(58) Field of Classification Search
CPC .. C01B 3/36; C01B 3/56; C01B 32/40; C01B 2203/0244; C01B 2203/0283; C01B 2203/062; C25B 1/04; C25B 15/081; C10G 2/30
See application file for complete search history.

(56) References Cited

U.S. PATENT DOCUMENTS

| | | | |
|---|---|---|---|
| 10,697,032 B2 | 6/2020 | Achatz et al. | |
| 2011/0054047 A1* | 3/2011 | Severinsky | C25B 1/04 422/186 |
| 2013/0261818 A1 | 10/2013 | Monical | |
| 2021/0340077 A1 | 11/2021 | Schuetzle et al. | |

OTHER PUBLICATIONS

Cummins, "Electrolyzer 101: What they are, how they work, and how they fit in the green economy," www.commins.com/news/2020/11/16 p. 2 (2020).

(Continued)

*Primary Examiner* — Jafar F Parsa
(74) *Attorney, Agent, or Firm* — McKinney Law Group APC; Jeffrey A. McKinney (57) ABSTRACT

Provided herein are systems and methods for controlling production of low-carbon liquid fuels and chemicals. In an aspect, provided herein is a method controlling a process that produces e-fuels. In another aspect, provided herein is a system for producing an e-fuel.

19 Claims, 3 Drawing Sheets

(56) References Cited

OTHER PUBLICATIONS

Eichman, J., et al., "Optimizing an integrated renewable-electrolysis system," National Renewable Energy Lab Report #NREL/TP-5400-75635, pp. 1-55 (2020).
Ince, C., et al., "Modeling and simulation of Power-to-X systems, a review" Fuel, vol. 304, pp. 1-24 (2021).
Wulf, C., et al., "Review of Power-to-X demonstration projects in Europe," Frontiers in Energy Research, vol. 8, Article 191, pp. 1-12 (2020).

* cited by examiner

SYSTEMS AND METHODS FOR CONTROLLING A POWER-TO-X PROCESS TO REDUCE FEEDSTOCK COSTS

CROSS REFERENCE TO RELATED APPLICATIONS

Not applicable.

STATEMENT OF FEDERALLY SPONSORED RESEARCH

Not applicable.

NAMES OF PARTIES TO A JOINT RESEARCH AGREEMENT

Not applicable.

REFERENCE TO A SEQUENCE LISTING, A TABLE, OR A COMPUTER PROGRAM

Not applicable.

BACKGROUND OF THE INVENTION

Carbon dioxide is produced by many industrial and biological processes. Carbon dioxide is usually discharged into the atmosphere. However, since carbon dioxide has been identified as a significant greenhouse gas, carbon dioxide emissions need to be reduced from these processes. One such industrial process is the production of electrical power. Electrical power is increasingly being produced from renewable sources such as solar and wind which do not emit $CO_2$ and can sometimes be produced more cost effectively than power produced from fossil fuels.

However, while electrical power can be produced in a sustainable manner, there remains a need for fuels and chemicals that are produced with low, zero or negative $CO_2$ emissions. In some cases, this need can be fulfilled using e-fuels (synthetic fuels) that are made by storing electrical energy from renewable sources in the chemical bonds of liquid or gas molecules. E-fuels can be a drop-in alternative to aviation (e.g., jet) fuel, diesel fuel, gasoline, butanol, naphtha, synthetic natural gas, or other fuel products that are otherwise produced from fossil fuels. Furthermore, potential chemicals that can be produced using renewable power include ammonia, methanol, as well as high value added chemicals such as formaldehyde, acetic acid, acetic aldehyde, or lower olefins and aromatic compounds (e.g., as starting materials for fine chemical production). This category of e-fuel production processes can be referred to as "Power to X", referring to renewable power being a primary input in producing X, where X is fuels, chemicals, natural gas, and the like.

Production of e-fuels and chemicals can require a feedstock in addition to the electrical power. In some cases, this feedstock can include carbon, e.g., derived from $CO_2$ captured from other industrial sources, which $CO_2$ would otherwise be emitted into the atmosphere. In some cases, this feedstock can include nitrogen derived from several sources including air separation units. Some e-fuels or chemicals can be "carbon-negative", i.e., consuming more $CO_2$ than they emit in their production process. Water can be another feedstock to an e-fuel or chemical process, which can be electrolyzed using renewable power to produce oxygen ($O_2$) and hydrogen ($H_2$).

E-fuel production using Power to X utilizes renewable power as a primary input and therefore this input comprises the largest part of the operating expense of an e-fuels or other Power to X plant. A secondary cost may be additional feedstocks, such as $CO_2$, nitrogen, or other inputs.

FIELD OF THE INVENTION

The field of the invention is systems and methods for producing e-fuels or chemicals from renewable or low-carbon electricity and the methods for controlling and optimizing such processes.

DESCRIPTION OF RELATED ART

Various Power-to-X (PtX) concepts depend on the utilization of renewable or low-carbon electricity to produce hydrogen through the electrolysis of water. This hydrogen can be used directly as a final energy carrier or it can be converted into, for example, methane, synthesis gas, liquid fuels, electricity, or chemicals. Technical demonstration and systems integration are of major importance for integrating PtX into energy systems. Over 200 PtX research and demonstration projects have been announced or are underway.

A few of these projects have included some limited techniques for process optimization. Schmidt et al (2017) incorporated energy storage processes to help balance intermittent and unreliable electricity supplies for the electrolysis of water.

Eichman et al (2020) described the optimization of an integrated renewable electrolyzer system. This optimization model determined the net benefits of combining wholesale and retail energy markets and demand. However, this model did not include the variability in the cost of feedstocks, alternative sources of hydrogen, fluctuations in the wholesale and retail value of products, and the recycling of secondary products (e.g., catalyst tail-gases).

Therefore, the overall control and optimization of such complex systems to external stimuli such as economics has not been accomplished.

BRIEF SUMMARY OF THE INVENTION

The present disclosure describes systems and methods for producing e-fuels or chemicals such as aviation fuel, diesel, methanol, and ammonia, as well as the synthesis of oxygenated and non-oxygenated chemical feedstocks. Recognized herein is a need to control these systems in response to a stimulus such as the price or availability of electrical power, the price or availability of $CO_2$, nitrogen or other feedstocks. In various aspects, this need is satisfied by the systems and methods provided herein.

In an aspect, provided herein is a method for controlling a process that produces e-fuels. The method can include providing a first amount of electrical power to an electrolysis module to produce $H_2$, mixing the $H_2$ with $CO_2$ to provide a gas mixture having a first ratio of $H_2$ to $CO_2$, performing a reverse water gas shift reaction on the gas mixture to produce synthesis gas, and catalytically converting the synthesis gas to produce a liquid hydrocarbon. The method can further include, in response to a stimulus, providing a second amount of electrical power to the electrolysis module to produce $H_2$, mixing the $H_2$ with $CO_2$ to provide a gas mixture having a second ratio of $H_2$ to $CO_2$, performing a reverse water gas shift reaction on the gas mixture to produce synthesis gas, and reacting the synthesis gas to produce a liquid hydrocarbon. The second amount of electrical power is a value between zero and the value of the first amount of electrical power. The second ratio of $H_2$ to $CO_2$ is substantially similar to the first ratio of $H_2$ to $CO_2$.

In some embodiments, the stimulus is associated with an availability of electrical power.

In some embodiments, the stimulus is associated with a price of electrical power.

In some embodiments, the stimulus is associated with an availability of $CO_2$.

In some embodiments, the stimulus is associated with a price of $CO_2$.

In some embodiments, the stimulus is temporary.

In some embodiments, the stimulus lasts for an amount of time between 0 and 12 hours.

In some embodiments, following the stimulus, the first amount of electrical power is provided to the electrolysis module.

In some embodiments, $H_2$ is drawn from a pipeline in response to the stimulus.

In some embodiments, the $H_2$ is produced by the electrolysis module and stored.

In some embodiments, $H_2$ is drawn from storage in response to the stimulus.

In some embodiments, $H_2$ is recovered from a product stream of the reaction of synthesis gas to the liquid hydrocarbon.

In some embodiments, the $H_2$ is recovered using pressure swing adsorption.

In some embodiments, the second amount of electrical power is an amount between 0% and 70% of the first amount of electrical power.

In some embodiments, an amount of electrical power delivered to a reactor performing the water gas shift reaction is reduced by an amount which is an amount between 0% and the ratio of the second amount of electrical power to the first amount of electrical power.

In some embodiments, a flowrate of the gas mixture is reduced by an amount between 20% and 100%.

In some embodiments, the first and/or second amounts of electrical power are derived from renewable resources.

In some embodiments, the liquid hydrocarbon is a fuel.

In some embodiments, the first ratio and the second ratio are between 2.0 and 4.0.

In another aspect, provided herein is a system for producing an e-fuel. The system can include an electrolysis module that is capable of using electrical power to convert water into an electrolysis product stream comprising $H_2$. The system can include a reverse water gas shift module that is capable of reacting $CO_2$ with the electrolysis product stream to produce a synthesis gas mixture comprising CO and $H_2$. The system can further include a sensor capable of detecting a stimulus, a controller capable of controlling a hydrogen recovery module in response to the stimulus. The hydrogen recovery module is capable of recovering $H_2$ from the synthesis gas mixture to produce (i) a $H_2$ stream which is directed to the reverse water gas shift module and (ii) a synthesis gas mixture that is depleted in $H_2$. The system can further include a hydrocarbon synthesis module capable of converting the synthesis gas mixture that is depleted in $H_2$ into a liquid hydrocarbon and an auto-thermal reforming (ATR) module capable of reacting $O_2$ from the electrolysis module with (i) unreacted reactants from the hydrocarbon synthesis module and (ii) hydrocarbons having fewer than 5 carbon atoms from the hydrocarbon synthesis module to produce an ATR product stream capable of being fed to the hydrocarbon synthesis module.

In some embodiments, the sensor detects a ratio of $H_2$ to $CO_2$ in the input to the reverse water gas shift module.

In some embodiments, the stimulus is a ratio of $H_2$ to $CO_2$ in the input to the reverse water gas shift module is an amount between 0 and 2.5.

In some embodiments, the hydrogen recovery module comprises a pressure swing adsorber (PSA).

In some embodiments, the hydrogen recovery module is not operated in the absence of the stimulus.

In some embodiments, compared with the hydrogen recovery module not being operated, operation of the hydrogen recovery module increases a ratio of CO to $H_2$ being fed to the hydrocarbon synthesis module.

In some embodiments, compared with the hydrogen recovery module not being operated, operation of the hydrogen recovery module increases an average molecular weight of the liquid hydrocarbon that is produced by the hydrocarbon synthesis module.

It should be appreciated that all combinations of the foregoing concepts and additional concepts discussed in greater detail below (provided such concepts are not mutually inconsistent) are contemplated as being part of the inventive subject matter disclosed herein. In particular, all combinations of subject matter within this disclosure are contemplated as being part of the inventive subject matter disclosed herein.

Still other aspects, examples, and advantages of these exemplary aspects and examples, are discussed in detail below. Moreover, it is to be understood that both the foregoing information and the following detailed description are merely illustrative examples of various aspects and examples and are intended to provide an overview or framework for understanding the nature and character of the claimed aspects and examples. Any example disclosed herein may be combined with any other example in any manner consistent with at least one of the objects, aims, and needs disclosed herein, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

DETAILED DESCRIPTION OF THE INVENTION

As renewable power becomes more economical and more widely deployed, chemical processes that store solar power in chemical bonds (i.e., e-fuels and electro chemicals) such as the ones described herein become more attractive. One advantage of renewable power (e.g., wind and solar) is that they do not consume a limited feedstock and can have a low unit cost of production compared to power derived from fossil fuels. However, one disadvantage can be that sunshine and wind are not constant throughout the year or even within a single day (i.e., are variable). Therefore, without storage of power, supplement of non-renewable power, or other design considerations as described herein, the e-fuel or electrochemical process can occasionally need to be turned down. As used herein, the term "turn down" or "turned down" generally refers to a voluntary reduction in the output of a manufacturing process.

However, continuous industrial processes (e.g., those that produce fuels and chemicals) are typically difficult and time-consuming to turn down. Those processes that are better able to reduce their power consumption intermittently, often on short notice, can enjoy significant economic advantages over those that cannot (e.g., by having a lower average cost of power input).

Figure 1:
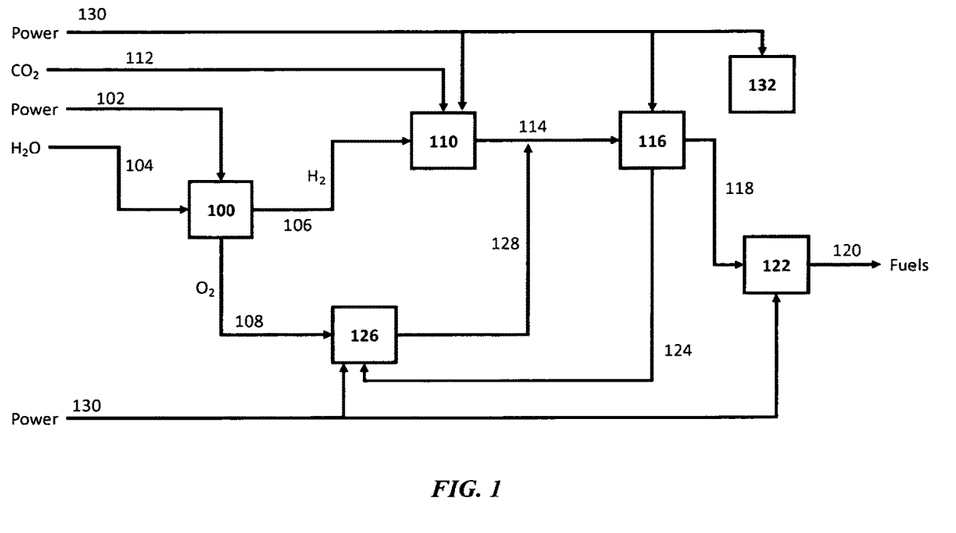
FIG. 1 shows an example of a process for the production of e-fuels from renewable power and $CO_2$, which can be turned down.

One such advantageous process for producing fuels and chemicals is described herein and depicted schematically in FIG. 1. Overall, this process converts power, $CO_2$ and water into fuels and chemicals. Here, an electrolyzer 100 can use power 102 to convert water 104 into hydrogen 106 and oxygen 108. The hydrogen can be fed to a reverse water-gas-shift module 110 to be combined with $CO_2$ 112 to produce synthesis gas (syngas) 114 comprising carbon monoxide (CO) and hydrogen. The syngas can be reacted in a liquid fuel production module 116 to produce liquid hydrocarbons 118, which can be separated into fuel and chemical products 120 in a fractionation module 122. The productivity of the process can be improved by taking the tail gas 124 from the liquid fuel production module to an autothermal reforming module 126 to be reacted with oxygen 108 produce additional feedstock 128 for the liquid fuel production module.

The system depicted in FIG. 1 can be more readily turned down than competing processes for producing liquid fuels and chemicals because a large fraction of the overall power consumption of the process goes to 102 the electrolyzer 100. Additional power 130 can go to utilities 132 or modules other than the electrolyzer (e.g., reverse water-gas-shift, liquid fuel production, fractionation, autothermal reformer). However, these are typically much smaller than the amount of power that is dedicated to electrolysis. In some cases, an amount between 75% and 100% of the total power consumed by the process is consumed by the electrolyzer.

In some cases, the output of the process is kept as high as possible given a decrease (i.e., turn down) of an amount of an input to the process (e.g., power). The process can be turned down in a manner that maintains the ability to turn the process back up quickly with minimal disruption. For example, reactors can be kept at or near production temperatures and pressures. Such is the case here, with reference to FIG. 1, power can be maintained to most or all of the process 130 except for the electrolyzer 102. Overall, with respect to power consumption, the process can be turned down by 10% to 100%.

Figure 2:
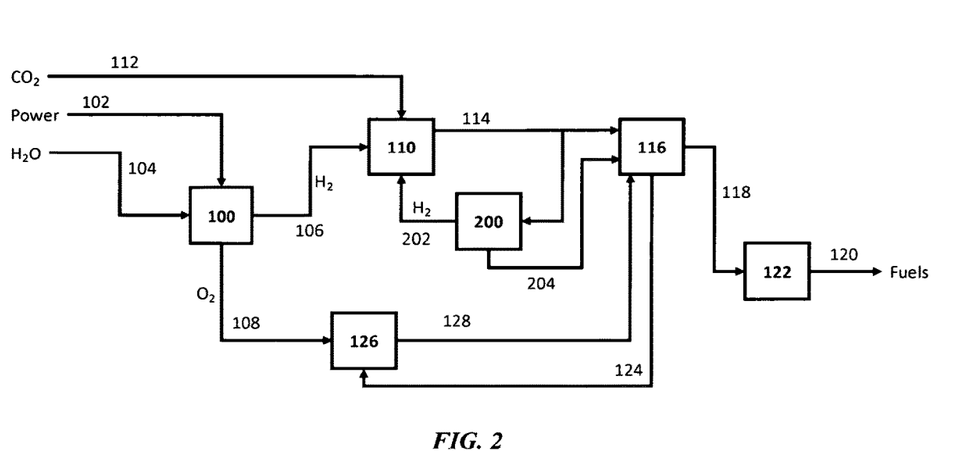
FIG. 2 shows an example of a process for temporarily recycling hydrogen from the effluent back to the input of a reverse water-gas-shift module.

The process can be improved or modified to maintain as much productivity as possible at a given level of turn down with respect to power consumption. For example, FIG. 2 shows a hydrogen recovery module 200 which takes the syngas product 114 from the reverse water-gas-shift module 110 and separates hydrogen. The hydrogen 202 can be returned to the reverse water-gas-shift module to supplement hydrogen that is provided directly from the electrolyzer 106.

The hydrogen recovery module 200 can be operated in a turndown case to maintain a suitable amount of hydrogen being fed to the reverse water-gas-shift module, which operates with a stoichiometric excess of excess hydrogen. The process can be turned down in response to a stimulus. The system can include a controller capable of controlling the hydrogen recovery module in response to the stimulus. The hydrogen recovery module is capable of recovering $H_2$ from the synthesis gas mixture to produce (i) a $H_2$ stream 202 which is directed to the reverse water gas shift module 110 and (ii) a synthesis gas mixture that is depleted in $H_2$ 204, which can be sent to liquid fuel production 116.

Operation of the hydrogen recovery module 200 can change the products 120 produced by the process. In some cases, the distribution of molecular weights of the product molecules is increased. This can be because less hydrogen and more relative CO being fed to the liquid fuel production module 116 can promote carbon chain extension rather than termination. This change in the product can be an acceptable trade-off for higher overall productivity during the turndown in response to the stimulus, but may be undesirable longer term (i.e., when the stimulus isn't present).

The stimulus can be any suitable signal. In some instances, the stimulus is associated with an availability of electrical power and/or a price of electrical power and/or the price of transmission or distribution (T&D) of the electrical power. The price and availability of renewable power can vary, sometimes substantially, throughout the year, or even within a single day. The price and availability of T&D of the electrical power can vary, sometimes substantially, throughout of the year, or even within a single day. For example, various portions of the year (e.g., summer vs winter) or day (e.g., day vs night) can produce more or less average solar power respectively. Variations in the weather (e.g., clouds or wind) is another source of variability. The demand for power is also variable and not always predictable far in advance. These demand fluctuations can be driven e.g., by the need for additional power when more people are active during the day, or by additional air conditioning when the weather is hot. These factors and more can contribute to variability in the availability or price of power.

In addition, utility companies try to incentivize power consumers to use less power during periods of peak demand and/or low production in order to manage the power grid, particularly as more of the grid is powered by variable renewable resources. This management might be best achieved by incentivizing the largest (industrial) consumers of power to avoid or reduce their usage during peak times. For example, a program might charge a large industrial consumer less for power even in non-peak times if that consumer can avoid or reduce power consumption during peaks.

These peaks can be any relevant period of time. In addition, the utility might inform the power consumer about these peak times any relevant period of time in advance.

In some cases, the stimulus is associated with an availability of $CO_2$ or other feedstocks such as nitrogen to an e-fuels plant. For example, the process described herein can be coupled to a process that would otherwise emit $CO_2$ and that process could be operated intermittently or itself need to be turned down in response to an event. In such case, additional $CO_2$ could be supplemented from another source such as a pipeline, or the process can be turned down as described herein. The stimulus can also be associated with a price of $CO_2$.

In some cases, the stimulus is a ratio of $H_2$ to $CO_2$ in the input to the reverse water gas shift module. In normal operation, this ratio is between 2.0 and 4.0.

The process can be turned back up following the stimulus. In some cases, following the stimulus, the first amount of electrical power is again provided to the electrolysis module.

Hydrogen can be recovered and recycled to the reverse water-gas-shift module in any suitable way. In some cases, hydrogen is recovered with the assistance of a selective membrane. The hydrogen recovery module can comprise a pressure swing adsorber (PSA).

In some cases, the hydrogen recovery module is not operated in the absence of the stimulus. In some instances, compared with the hydrogen recovery module not being operated, operation of the hydrogen recovery module increases a ratio of CO to $H_2$ being fed to the hydrocarbon synthesis module. Compared with the hydrogen recovery module not being operated, operation of the hydrogen recovery module can increase an average molecular weight of the liquid hydrocarbon that is produced by the hydrocarbon synthesis module.

The stimulus can be temporary. The stimulus can last for any relevant period of time.

Periods of turndown with respect to power consumption can also be managed by supplementing hydrogen from another source (i.e., to make up for the reduced hydrogen being produced by the electrolyzer). For instance, hydrogen could be temporarily purchased from another, external, source such as a pipeline. Excess hydrogen can also be produced and stored by the electrolyzer during periods of excess power for use later during a turn down scenario in response to a stimulus.

Figure 3:
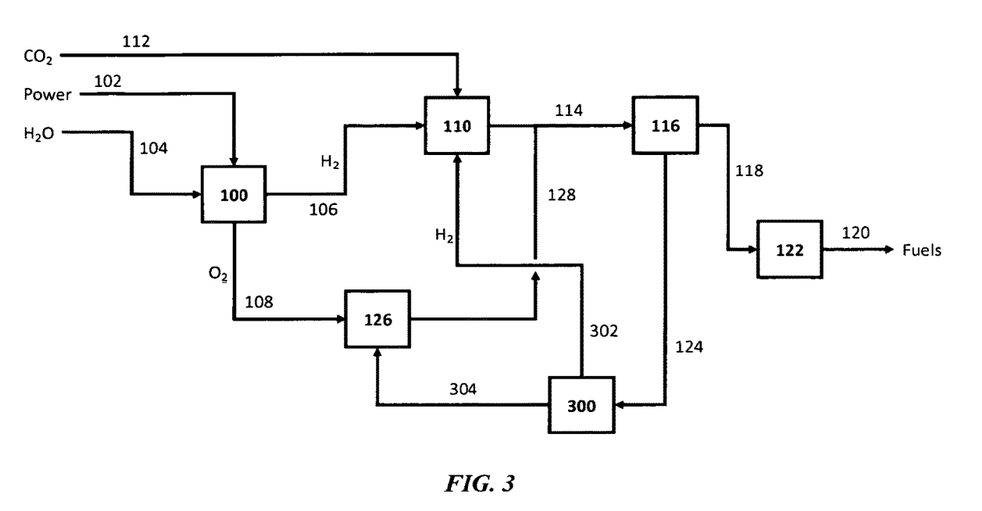
FIG. 3 shows an example of a process for recovering and recycling hydrogen in an e-fuel process, such as during a turn down.

FIG. 3 shows another system for managing hydrogen (e.g., during a process turn-down). In an aspect, a system is provided for producing an e-fuel. The system can include an electrolysis module that is capable of using electrical power to convert water into an electrolysis product stream comprising $H_2$. The system can further include a reverse water gas shift module that is capable of reacting $CO_2$ with the electrolysis product stream to produce a synthesis gas mixture comprising CO and $H_2$. The system can further include a hydrocarbon synthesis module capable of converting the synthesis gas mixture into a liquid hydrocarbon. The system can further include a hydrogen recovery module capable of recovering $H_2$ from the hydrocarbon synthesis module and feeding said $H_2$ to the reverse water gas shift module. The system can further include an auto-thermal reforming (ATR) module capable of reacting $O_2$ from the electrolysis module with (i) unreacted reactants from the hydrocarbon synthesis module and/or the hydrogen recovery module and (ii) hydrocarbons having fewer than 5 carbon atoms from the hydrocarbon synthesis module and/or the hydrogen recovery module to produce an ATR product stream capable of being fed to the hydrocarbon synthesis module.

With reference to FIG. 3, hydrogen in the tail gas 124 can be recovered in a hydrogen recovery module 300 to produce (i) a $H_2$ stream 302 which is directed to the reverse water gas shift module 110 and (ii) a tail gas mixture that is depleted in $H_2$ 304, which can be sent to the autothermal reformer 126. Hydrogen can be recovered and recycled to the reverse water-gas-shift module in any suitable way. In some cases, hydrogen is recovered with the assistance of a selective membrane. The hydrogen recovery module can comprise a pressure swing adsorber (PSA).

In another aspect, provided herein is a method for controlling a process that produces e-fuels. The method can include providing a first amount of electrical power to an electrolysis module to produce Hz, mixing the $H_2$ with $CO_2$ to provide a gas mixture having a first ratio of $H_2$ to $CO_2$, performing a reverse water gas shift reaction on the gas mixture to produce synthesis gas, and reacting the synthesis gas to produce a liquid hydrocarbon. The method can further include, in response to a stimulus, providing a second amount of electrical power to the electrolysis module to produce $H_2$, mixing the $H_2$ with $CO_2$ to provide a gas mixture having a second ratio of $H_2$ to $CO_2$, performing a reverse water gas shift reaction on the gas mixture to produce synthesis gas, and reacting the synthesis gas to produce a liquid hydrocarbon. The second amount of electrical power is between zero and the value of the first amount of electrical power. The second ratio of $H_2$ to $CO_2$ is substantially similar to the first ratio of $H_2$ to $CO_2$.

The second amount of power can be any suitable fraction of the first amount of power (i.e., amount of turn down with respect to power consumption). The second amount of electrical power can be an amount between 0% and 70% of the first amount of electrical power. Following the stimulus, the first amount of electrical power can be provided to the electrolysis module (i.e., the process can be turned back up).

In some embodiments, the flowrate of the gas mixture (i.e., of $H_2$ with $CO_2$) is reduced (i.e., amount of turn down with respect to reactant consumption). The flowrate of the gas mixture can be an amount between 0% and 70% of the flowrate of the gas mixture at full capacity of the process. In some cases, the flowrate of the gas mixture is between 0% and 70% of the flowrate of the gas mixture at full capacity of the process.

The first ratio and/or the second ratio of $H_2$ to $CO_2$ can be between 2.0 and 4.0; preferably between 2.5 and 3.5; and even more preferably between 2.8 and 3.2.

The second ratio of $H_2$ to $CO_2$ is substantially similar to the first ratio of $H_2$ to $CO_2$. In some instances, the first and second ratio differ by no more than 40%; preferably no more than 15%; and even more preferably no more than 3%.

In some embodiments, $H_2$ is drawn from a pipeline in response to the stimulus. In some embodiments, the $H_2$ is produced by the electrolysis module and stored. In some embodiments, $H_2$ is drawn from storage in response to the stimulus. In some embodiments, $H_2$ is recovered from a product stream of the reaction of synthesis gas to the liquid hydrocarbon. In some embodiments, the $H_2$ is recovered using pressure swing adsorption. In some embodiments, an amount of electrical power delivered to a reactor performing the reverse water gas shift reaction is reduced by an amount which is a value between zero and the value of the ratio of the second to the first amounts of electrical power.

Carbon dioxide can be obtained from several sources. Industrial manufacturing plants that produce ammonia for fertilizer produce large amounts of carbon dioxide. Ethanol plants that convert corn or wheat into ethanol produce large amounts of carbon dioxide. Power plants that generate electricity from various resources (for example natural gas, coal, other resources) produce large amounts of carbon dioxide. Chemical plants such as nylon production plants, ethylene production plants, other chemical plants produce large amounts of carbon dioxide. Some natural gas processing plants produce $CO_2$ as part of the process of purifying the natural gas to meet pipeline specifications. Capturing $CO_2$ for utilization as described here often involves separating the carbon dioxide from a flue gas stream or another stream where the carbon dioxide is not the major component. Some $CO_2$ sources are already relatively pure and can be used with only minor treatment (which may include gas compression) in the processes described herein. Some processes may require an alkylamine or other method that would be used to remove the carbon dioxide from the flue gas steam. Alkylamines used in the process include monoethanolamine, diethanolamine, methydiethanolamine, disopropylamine, aminoethoxyethnol, or combinations thereof. Metal Organic Framework (MOF) materials have also been used as a means of separating carbon dioxide from a dilute stream using chemisorption or physisorption to capture the carbon dioxide from the stream. Other methods to get concentrated carbon dioxide include chemical looping combustion where a circulating metal oxide material captures the carbon dioxide produced during the combustion process. Carbon dioxide can also be captured from the atmosphere in what is called direct air capture (DAC) of carbon dioxide.

Renewable sources of Hydrogen ($H_2$) can be produced from water via electrolysis.

$$H_2O = H_2 + \frac{1}{2}O_2$$

This reaction uses electricity to split water into hydrogen and oxygen. Electrolyzers consist of an anode and a cathode separated by an electrolyte. Different electrolyzers function in slightly different ways, mainly due to the different type of electrolyte material involved.

However, each electrolysis technology has a theoretical minimum electrical energy input of 39.4 kWh/kgH$_2$ (HHV of hydrogen) if water is fed at ambient pressure and temperature to the system and all energy input is provided in the form of electricity. The required electrical energy input may be reduced below 39.4 kWh/kgH$_2$ if suitable heat energy is provided to the system. Besides electrolysis, significant current research is examining ways to split water into hydrogen and oxygen using light energy and a photocatalyst.

Different electrolyzer designs that use different electrolysis technology can be used including alkaline electrolysis, membrane electrolysis, polymer electrolyte membrane (PEM), solid oxide electrolysis (SOE), and high temperature electrolysis. Alkaline electrolysis is commercially capable of the larger >1 MW scale operation. Different electrolytes can be used including liquids KOH and NaOH with or without activating compounds can be used. Activating compounds can be added to the electrolyte to improve the stability of the electrolyte. Most ionic activators for hydrogen evolution reaction are composed of ethylenediamine (en)-based metal chloride complex ([M(en)3]Clx,M¼Co, Ni, et al.) and Na$_2$MoO$_4$ or Na$_2$WO$_4$. Different electrocatalysts can be used on the electrodes including many combinations of metals and oxides like Raney-Nickel-Aluminum, which can be enhanced by adding cobalt or molybdenum to the alloy. Several combinations of transition metals, such as Pt$_2$Mo, Hf$_2$Fe, and TiPt, have been used as cathode materials and have shown significantly higher electrocatalytic activity than state-of-the-art electrodes.

Water at the cathode combines with electrons from the external circuit to form hydrogen gas and negatively charged oxygen ions. The oxygen ions pass through the solid ceramic membrane and react at the anode to form oxygen gas and generate electrons for the external circuit. In this way, both hydrogen gas and oxygen gas are produced in the electrolyzer. In one embodiment, multiple electrolyzers are operated in parallel. No electrolyzer operates with 100% energy efficiency and energy usage is critical to the economic operation of the facility. The energy usage in the electrolyzer should be between 0 and 200 mega-watthours (MWh)/metric ton (MT) of H$_2$ produced; preferably between 0 and 120 MWh/MT H$_2$ produced; and even more preferably between 0 and 60 MWh/MT H$_2$ produced. For the alkaline electrolyzer embodiment, the electricity usage will be greater than 39.4 MWh/MT H$_2$ produced. However, for the high temperature electrolyzer embodiment, the electricity usage can potentially be between 0 and 39.4 MWh/MT H$_2$ produced if waste heat is used to heat the electrolyzer above ambient temperature.

As described herein, the reverse water-gas-shift (RWGS) reaction can be used to produce syngas according to the formula:

$$CO_2 + H_2 = CO + H_2O$$

This reaction converts carbon dioxide and hydrogen to carbon monoxide and water. This reaction is endothermic at room temperature and requires heat to proceed and elevated temperature and a good catalyst is required for significant carbon dioxide conversion.

Hydrogen and carbon dioxide are mixed. The ratio of H$_2$/CO$_2$ can be between 2.0 mol/mol to 4.0 mol/mol, in some cases between 3.0 to 4.0 mol/mol. The mixed RWGS feedstock can be heated by indirect heat exchange to a temperature of greater than 900° F. This initial temperature rise can be done without the use of direct combustion of a carbon containing gas to provide the heat. This would mean that carbon dioxide was being produced and could possibly negate the impact of converting carbon dioxide to useful fuels and chemicals.

The RWGS feed gas, comprising a mixture of hydrogen and carbon dioxide, can be heated to an inlet temperature. The inlet temperature can be any suitable temperature for performing the RWGS reaction. In some cases, the inlet temperature of the RWGS feed is between 900° F. and 1800° F.

The RWGS feed gas can be heated at least partially in a preheater outside the main reactor vessel to produce a heated feed gas. The preheater can be electrically heated and raises the temperature of the feed gas through indirect heat exchange.

There can be numerous ways that the electrical heating of the feed gas can be done. One way is through electrical heating in an electrically heated radiant furnace. In some embodiments, at least a portion of the feed gas passes through a heating coil in a furnace. In the furnace, the heating coil is surrounded by radiant electric heating elements or the gas is passed directly over the heating elements whereby the gas is heated by some convective heat transfer. The electric heating elements can be made from numerous materials. The heating elements may be nickel chromium alloys. These elements may be in rolled strips or wires or cast as zig zag patterns. The elements are typically backed by an insulated steel shell, and ceramic fiber is generally used for insulation. The radiant elements may be divided into zones to give a controlled pattern of heating. Multiple coils and multiple zones may be needed to provide the heat to the feed gas and produce a heated feed gas. Radiant furnaces require proper design of the heating elements and fluid coils to ensure good view factors and good heat transfer. The electricity usage by the radiant furnace should be as low as possible. The electricity usage by the radiant furnace is between 0 and 0.5 MWh (megawatt-hour) electricity/metric ton (MT) of CO$_2$ in the feed gas; preferably between 0 and 0.40 MWh/MT CO$_2$; and even more preferably between 0 and 0.20 MWh/MT CO$_2$.

The heated RWGS feed gas stream can then be fed into the main RWGS reactor vessel. There are at least two possible embodiments of the main RWGS reactor vessel. In some embodiments, the main RWGS reactor vessel is adiabatic or nearly adiabatic and is designed to minimize heat loss, but no added heat is added to the main reactor vessel and the temperature in the main reactor vessel will decline from the inlet to the outlet of the reactor. In some embodiment, the main RWGS reactor vessel is similarly designed but additional heat is added to the vessel to maintain an isothermal or nearly isothermal temperature profile in the vessel. The main RWGS reactor vessel can be a reactor with a length longer than diameter. The entrance to the main reactor vessel can be smaller than the overall diameter of the vessel. The main reactor vessel can be a steel vessel. The steel vessel can be insulated internally to limit heat loss. Various insulations including poured or castable refractory lining or insulating bricks may be used to limit the heat losses to the environment.

A bed of catalyst can be inside the main RWGS reactor vessel. The catalyst can be in the form of granules, pellets, spheres, trilobes, quadra-lobes, monoliths, or any other engineered shape to minimize pressure drop across the reactor. In some cases, the shape and particle size of the catalyst particles is managed such that pressure drop across the reactor is between 0 and 100 pounds per square inch (psi) (345 kPa) and preferably between 0 and 20 psi. The size of the catalyst form can have a characteristic dimension of between 1 mm and 10 mm. The catalyst particle can be a structured material that is porous material with an internal surface area greater than 40 $m^2/g$, in some cases greater than 80 $m^2/g$ with some cases having a surface area of 100 $m^2/g$.

The RWGS catalyst can be a high-performance solid solution catalyst that is highly versatile, and which efficiently performs the RWGS reaction. The robust, solid solution transition metal catalyst can have a high thermal stability up to 1,100° C., does not form carbon (coking), and has good resistance to contaminants that may be present in captured $CO_2$ streams. This catalyst can exhibit high activity at low transition metal concentrations (5-20 wt. %), compared to other catalysts that require at least 30 wt. % transition metals. Furthermore, the use of expensive precious metals to enhance catalyst performance is not necessary. The manufacturing process for the RWGS catalyst can produce a catalyst that forms a solid solution phase, bimetallic crystalline phase that leads to little or no segregation of the metal phases. This chemical structure can lead to enhanced resistance to coking, when compared to conventional metal supported catalysts. This can also lead to enhanced resistance to poisons such as sulfur and ammonia. In addition, this catalyst can have enhanced catalytic activity at lower surface area compared to monometallic segregated catalyst phase for example Ni on alumina. In some instances, this catalyst requires no alkali promotion needed to curb the carbon deposition.

In some cases, the pressure of the RWGS step and the pressure of the hydrocarbon synthesis or Liquid Fuel Production (LFP) step are within 200 psi of each other, in some cases within 100 psi of each other, and in some cases within 50 psi of each other. Operating the two processes at pressures close to each other limit the required compression of the syngas stream.

The per pass conversion of carbon dioxide to carbon monoxide in the main RWGS reactor vessel can be between 60 and 90 mole % and in some cases between 70 and 85 mole %. If an adiabatic reactor is used, the temperature in the main RWGS reactor vessel can decline from the inlet to the outlet. The main RWGS reactor vessel outlet temperature can be 100° F. to 200° F. less than the main reactor vessel inlet temperature and in some cases between 105 and 160° F. lower than the main reactor inlet temperature. The RWGS Weight Hourly Space Velocity (WHSV) which is the mass flow rate of RWGS reactants ($H_2+CO_2$) per hour divided by the mass of the catalyst in the main RWGS reactor bed can be between 1,000 and 50,000 $hr^{-1}$ and in some cases between 5,000 and 30,000 $hr^{-1}$.

The gas leaving the main RWGS reactor vessel is the RWGS product gas stream. The RWGS product gas comprises carbon monoxide (CO), hydrogen ($H_2$), unreacted carbon dioxide ($CO_2$), and water ($H_2O$). Additionally, the RWGS product gas may also comprise a small quantity of methane ($CH_4$) that was produced in the main reactor vessel by a side reaction.

The RWGS product gas can be used in a variety of ways at this point in the process. The product gas can be cooled and compressed and used in downstream process to produce fuels and chemicals. The RWGS product gas can also be cooled, compressed, and sent back to the preheater and fed back to the main reactor vessel. The RWGS product gas can also be reheated in second electric preheater and sent to a second reactor vessel where additional conversion of $CO_2$ to CO can occur.

With the CO (carbon monoxide) from the RWGS reaction and hydrogen from the electrolysis of water, the potential exists for useful products through the catalyst hydrogenation of carbon monoxide to hydrocarbons. Mixtures of $H_2$ and CO are called synthesis gas or syngas. Syngas may be used as a feedstock for producing a wide range of chemical products, including liquid fuels, alcohols, acetic acid, dimethyl ether, methanol, ammonia, and many other chemical products.

The catalytic hydrogenation of carbon monoxide to produce light gases, liquids and waxes, ranging from methane to heavy hydrocarbons (C100 and higher) in addition to oxygenated hydrocarbons, is typically referred to Fischer-Tropsch (or F-T) synthesis. Traditional low temperature (<250° C.) F-T processes primarily produce a high weight (or wt. %) F-T wax (C25 and higher) from the catalytic conversion process. These F-T waxes are then hydrocracked and/or further processed to produce diesel, naphtha, and other fractions. During this hydrocracking process, light hydrocarbons are also produced, which may require additional upgrading to produce viable products. The catalysts that are commonly used for F-T are either Cobalt (Co) based, or Iron (Fe) based catalysts are also active for the water gas shift (WGS) reaction that results in the conversion of feed carbon monoxide to carbon dioxide.

In addition to F-T, the Liquid Fuel Production (LFP) module described herein can be used. The LFP reactor converts CO and $H_2$ into long chain hydrocarbons that can be used as liquid fuels and chemicals. This reactor can use a catalyst for production of liquid fuel range hydrocarbons from syngas. Syngas from syngas cooling and condensing can be blended with tail gas to produce an LFP reactor feed. The LFP reactor feed comprises hydrogen and carbon monoxide. Ideally the hydrogen to carbon monoxide ratio in the stream is between 1.9 and 2.2 mol/mol. The LFP reactor can be a multi-tubular fixed bed reactor system. Each LFP reactor tube can be between 13 mm and 26 mm in diameter. The length of the reactor tube is generally greater than 6 meters in length and in some cases greater than 10 meters in length. The LFP reactors are generally vertically oriented with LFP reactor feed entering at the top of the LFP reactor. However, horizontal reactor orientation is possible in some circumstances and setting the reactor at an angle may also be advantageous in some circumstances where there are height limitations.

Most of the length of the LFP reactor tube can be filled with LFP catalyst. The LFP catalyst may also be blended with diluent such as silica or alumina to aid in the distribution of the LFP reactor feed into and through the LFP reactor tube. The chemical reaction that takes place in the LFP reactor produces an LFP product gas that comprises most hydrocarbon products from five to twenty-four carbons in length ($C_5$-$C_{24}$ hydrocarbons) as well as water, although some hydrocarbons are outside this range. The LFP reactor does not typically produce any significant amount of carbon dioxide. An amount between 0% and 2% of the carbon monoxide in the LFP reactor feed is typically converted to carbon dioxide in the LFP reactor. Only a limited amount of the carbon monoxide in the LFP reactor feed is typically converted to hydrocarbons with a carbon number greater than 24. An amount between 0% and 25% of the hydrocarbon fraction of the LFP product has a carbon number greater than 24. In some cases, between 0 and 10 wgt % of the hydrocarbon fraction of the LFP product has a carbon number greater than 24; and preferably between 0 and 4 wgt % of the hydrocarbon fraction of the LFP product has a carbon number greater than 24; and even more preferably between 0 and 1 wgt % of the hydrocarbon fraction of the LFP product has a carbon number greater than 24.

As discussed above, Fischer-Tropsch (F-T) processes generally make hydrocarbon products that are from 1 to 125 carbon atoms in length. The LFP catalyst described herein does not produce heavy hydrocarbons with the same yield as other catalysts used in the F-T process. In some embodiments, the LFP catalyst has insignificant activity for the conversion of conversion of carbon monoxide to carbon dioxide via the water-gas-shift reaction. In some embodiments, the water gas shift conversion of carbon monoxide to carbon dioxide is between 0% and 5% of the carbon monoxide in the feed. In some embodiments, the LFP catalyst comprises cobalt as the active metal. In some embodiments, the LFP catalyst comprises iron as the active metal. In some embodiments, the LFP catalyst comprises combinations of iron and cobalt as the active metal. The LFP catalyst can be supported on a metal oxide support that chosen from a group of alumina, silica, titania, activated carbon, carbon nanotubes, zeolites or other support materials with sufficient size, shape, pore diameter, surface area, crush strength, effective pellet radius, or mixtures thereof. The catalyst can have various shapes of various lobed supports with either three, four, or five lobes with two or more of the lobes being longer than the other two shorter lobes, with both the longer lobes being symmetric. The distance from the mid-point of the support or the mid-point of each lobe is called the effective pellet radius which can contribute to achieving the desired selectivity to the $C_5$ to $C_{24}$ hydrocarbons. The LFP catalyst promoters may include one of the following: nickel, cerium, lanthanum, platinum, ruthenium, rhenium, gold, or rhodium. The LFP catalyst promoters are between 0 and 1 wt. % of the total catalyst and preferably between 0 and 0.5 wt. % and even more preferably between 0 and 0.1 wt. %.

The LFP catalyst support can have a pore diameter greater than 8 nanometers (nm), a mean effective pellet radius between 0 and 600 microns, a crush strength greater than 3 lbs/mm and a BET surface area of greater than 100 $m^2/g$. The catalyst after metal impregnation can have a metal dispersion of 4%. Several types of supports have can maximize the $C_5$-$C_{24}$ hydrocarbon yield. These can include alumina/silica combinations, activated carbon, alumina, carbon nanotubes, and/or zeolite-based supports.

The LFP fixed bed reactor can be operated in a manner to maximize the $C_5$-$C_{24}$ hydrocarbon yield. The LIT reactor can be operated at pressures between 150 to 450 psi. The reactor can be operated over a temperature range from 350 to 460° F. and more typically at around 410° F. The reaction is exothermic. The temperature of the reactor can be maintained inside the LFP reactor tubes by the reactor tube bundle being placed into a heat exchanger where boiling steam is present on the outside of the LFP reactor tubes. The steam temperature is at a lower temperature than the LFP reaction temperature so that heat flows from the LFP reactor tube to the lower temperature steam. The steam temperature can be maintained by maintaining the pressure of the steam. The steam is generally saturated steam. In some embodiments, the catalytic reactor can be a slurry reactor, microchannel reactor, fluidized bed reactor, or other reactor types known in the art.

The CO conversion in the LFP reactor can be maintained at between 30 to 80 mole % CO conversion per pass. CO can be recycled for extra conversion or sent to a downstream additional LFP reactor. The carbon selectivity to $CO_2$ can be minimized to an amount between 0% and 4% of the converted CO and in more preferably between 0% and 1%. The carbon selectivity for C5-C24 hydrocarbons can be between 60 and 90%. The LFP reactor product gas contains the desired C5-C24 hydrocarbons, which are condensed as liquid fuels and water, as well as unreacted carbon monoxide, hydrogen, a small amount of C1-C4 hydrocarbons, and a small amount of C24+ hydrocarbons. The desired product can be separated from the stream by cooling, condensing the product and/or distillation or any other acceptable means. The unreacted carbon monoxide, hydrogen, and C1-C4 hydrocarbons can be part of the feed to the auto-thermal reformer (ATR).

In the auto-thermal reformer (ATR), the ATR hydrocarbon feed comprises carbon monoxide, hydrogen, and C1-C4 hydrocarbons. The auto-thermal reforming of natural gas that is predominately methane (C1) to carbon monoxide and hydrogen.

In some embodiments, the ATR hydrocarbon feed comprises the unreacted carbon monoxide, hydrogen, and C1-C4 hydrocarbons. In some cases, the feed also comprises natural gas. The natural gas comprises methane and may contain light hydrocarbons as well as carbon dioxide. In some embodiments, the fuel and chemicals produced may not be zero carbon fuels but will still have an improved carbon intensity over traditional fuels and chemicals. The ATR feed can be converted to syngas (including a large percentage of hydrogen). This can reduce the amount of water that needs to be electrolyzed to produce hydrogen and reduces the size of the electrolyzer. This may be more economical when producing low carbon fuels and chemicals. In the ATR hydrocarbon feed, the ratio of natural gas to LFP unreacted carbon monoxide, hydrogen, and C1-C4 hydrocarbons can be an amount between 0 kg/kg and 2.0 kg/kg, and more preferably an amount between 0 kg/kg and 1.25 kg/kg.

The ATR can produce a product that is high in carbon monoxide. The carbon dioxide in the product gas can be an amount between 0 mol % and 10 mol %. The ATR oxidant feed can comprise steam and oxygen where the oxygen is produced by the electrolysis of water. The ATR oxidant feed and the ATR hydrocarbon feed can be preheated and then reacted in an ATR burner where the oxidant and the hydrocarbon are partially oxidized at temperatures in the burner of greater than 2000° C. The ATR reactor can be divided into a plurality of zones. The combustion zone (or burner) is where at least portion of the ATR hydrocarbon feedstock is fully combusted to water and carbon dioxide. The thermal zone is where thermal reactions occur. In the thermal zone, further conversion occurs by homogeneous gas-phase-reactions. These reactions can be slower reactions than the combustion reactions like CO oxidation and pyrolysis reactions involving higher hydrocarbons. The main overall reactions in the thermal zone can include the homogeneous gas-phase steam hydrocarbon reforming and the shift reaction. In the catalytic zone, the final conversion of hydrocarbons takes place through heterogeneous catalytic reactions including steam methane reforming and water gas shift reaction. The resulting ATR product gas can have a composition that is close to the predicted thermodynamic equilibrium composition. The actual ATR product gas composition can be the same as the thermodynamic equilibrium composition within a difference of an amount between 0° C. and 70° C. This is the so-called equilibrium approach temperature. To keep the amount of $CO_2$ produced in the ATR to a minimum, the amount of steam in the ATR oxidant feed can be kept as low as possible. This can still result in a low soot ATR product gas that is close to the equilibrium predicted composition. Typically, the total steam to carbon ratio (mol/mol) in the combined ATR feed (oxidant+hydrocarbon) can be between 0.4 to 1.0, with the optimum being around 0.6. As the steam to carbon ratio in the ATR feed increases, the $H_2/CO$ ratio in the syngas increases. The amount of carbon dioxide also increases. In some embodiments, changing or adjusting the steam to carbon ratio can be beneficial to control the amount of overall hydrogen production in the facility.

The ATR product can leave the ATR catalytic zone at temperatures more than 800° C. The ATR product can be cooled to lower temperatures through a waste heat boiler where the heat is transferred to generate steam. This steam, as well as the lower pressure steam produced by the LFP reactor, can be used to generate electricity.

Suitable ATR catalysts for the catalytic zone reactions are typically nickel based. The novel solid solution catalyst described herein can be used as an ATR catalyst. Other suitable ATR catalysts are nickel on alpha phase alumina or magnesium alumina spinel ($MgAl_2O_4$) with or without precious metal promoters. The precious metal promoter can comprise gold, platinum, rhenium, or ruthenium. Spinels can have a higher melting point and a higher thermal strength and stability than the alumina-based catalysts.

The ATR product can be blended with the RWGS product and be used as LFP reactor feed. This can result in a high utilization of the original carbon dioxide to C5 to C24 hydrocarbon products.

In some embodiments, the LFP product gas is not suitable as a direct feed to the ATR and must be pre-reformed. In those cases, the LFP product gas comprising the unreacted carbon monoxide, hydrogen, C1-C4 hydrocarbons and CO2 comprise the pre-reformer hydrocarbon feed gas. The higher the higher hydrocarbons and carbon oxides in the stream may require the use of a pre-reformer instead of directly being used in as ATR hydrocarbon feed. The pre-reformer is generally an adiabatic reactor. The adiabatic pre-reformer converts higher hydrocarbons in the pre-reformer feed into a mixture of methane, steam, carbon oxides and hydrogen that are then suitable as ATR hydrocarbon feed. One benefit of using a pre-reformer is that it enables higher ATR hydrocarbon feed pre-heating that can reduce the oxygen used in the ATR. The resulting integrated process as described above results in high conversion of carbon dioxide to C5-C24 hydrocarbon products that are suitable as fuels or chemicals.

In some embodiments, an autothermal reforming (ATR) process that converts the tail gas (and potentially other hydrocarbon feedstocks) from the fuel/chemical production stage and oxygen from the electrolysis processes into additional syngas. In some embodiments, the use of heat energy from the ATR process for operation of the ($CO_2$) RWGS (hydrogenation) catalyst. In some embodiments, the separation and conversion of the $CO_2$ from the ATR process into additional syngas using the CO2 hydrogenation catalyst. In some embodiments, a RWGS catalyst, reactor, and process converts $CO_2$ and hydrogen into syngas and operating this RWGS operation at a pressure that is close to the pressure of the fuel/chemical production process, which converts the syngas into fuels or chemicals. In some cases, these fuels or chemicals are paraffinic or olefinic hydrocarbon liquids with a majority being in the C5-C24 range.

The systems and methods described herein can utilize a sensor. The sensor can be a flowrate sensor, a sensor that detects the chemical composition of a process stream, a temperature sensor, a pressure sensor, or a sensor coupled to the price or availability of a process input, such as $CO_2$ or electrical power.

In an aspect, the systems and methods described herein efficiently capture and utilize carbon dioxide and convert it into useful products such as fuels (e.g., diesel fuel, gasoline, gasoline blendstocks, jet fuel, kerosene, other) and chemicals (e.g., solvents, olefins, alcohols, aromatics, lubes, waxes, ammonia, methanol, other) that can displace fuels and chemicals produced from fossil sources such as petroleum and natural gas. This can lower the total net emissions of carbon dioxide into the atmosphere. Zero carbon, low carbon, or ultra-low carbon fuels and chemicals have minimal fossil fuels combusted in the process. In some cases, any heating of the feeds to the integrated process is done by indirect means (e.g., cross exchangers) or via electric heating where the electricity comes from a zero carbon or renewable source such as wind, solar, geothermal, or nuclear.

Certain Embodiments

The following are certain embodiment of processes for the conversion of carbon dioxide, water, and renewable electricity into low or zero carbon high quality fuels and chemicals:

1. Water is fed into an electrolysis system powered using renewable electricity to produce hydrogen and oxygen. Carbon dioxide is captured from a source. The carbon dioxide is mixed with the hydrogen from the electrolysis system to form a stream (Reverse Water Gas Shift feedstock or "RWGS" feedstock) that is heated and fed into a RWGS reactor vessel that includes a RWGS catalyst. The RWGS reactor converts the feedstock to an RWGS product gas comprising carbon monoxide, hydrogen, unreacted carbon dioxide and water. In response to a stimulus of an increase in the cost of renewable electricity, the amount of power supplied to the electrolysis system is reduced. To compensate for the reduced production of hydrogen, a controller activates a hydrogen recovery module which recovers hydrogen from the RWGS product gas and recycles it to the RWGS reactor. This compensation maintains the ratio of hydrogen and carbon dioxide between 2.0 and 4.0. The RWGS product gas is cooled, compressed, and fed into a Liquid Fuels Production ("LFP") system. The LFP system converts RWGS product gas into hydrocarbon products, where more than 50 percent of the products are C5 to C24 hydrocarbons.

2. Water is fed into an electrolysis system powered using renewable electricity to produce hydrogen and oxygen. Carbon dioxide is captured from a fermentation exhaust. The carbon dioxide is mixed with the hydrogen from the electrolysis system to form a stream (Reverse Water Gas Shift feedstock or "RWGS" feedstock) that is heated and fed into a RWGS reactor vessel that includes a RWGS catalyst. The RWGS reactor converts the feedstock to an RWGS product gas comprising carbon monoxide, hydrogen, unreacted carbon dioxide and water. In response to a stimulus of an increase in the cost of renewable electricity, the amount of power supplied to the electrolysis system is reduced. To compensate for the reduced production of hydrogen, additional hydrogen is drawn from a pipeline or hydrogen storage vessel. This compensation maintains the ratio of hydrogen and carbon dioxide between 2.0 and 4.0. The RWGS product gas is cooled, compressed, and fed into a Liquid Fuels Production ("LFP") system. The LFP system converts RWGS product gas into hydrocarbon products, where more than 50 percent of the products are C5 to C24 hydrocarbons.

3. Water is fed into an electrolysis system powered using renewable electricity to produce hydrogen and oxygen. Carbon dioxide is captured from a source. The carbon dioxide is mixed with the hydrogen from the electrolysis system to form a stream (Reverse Water Gas Shift feedstock or "RWGS" feedstock) that is heated and fed into a RWGS reactor vessel that includes a RWGS catalyst. The RWGS reactor converts the feedstock to an RWGS product gas comprising carbon monoxide, hydrogen, unreacted carbon dioxide and water. In response to a stimulus of an increase in the cost of renewable electricity, the amount of power supplied to the electrolysis system is reduced. To compensate for the reduced production of hydrogen, a controller activates a hydrogen recovery module which recovers hydrogen from the RWGS product gas and recycles it to the RWGS reactor. This compensation maintains the ratio of hydrogen and carbon dioxide between 2.0 and 4.0. The RWGS product gas is cooled, compressed, and fed into a Liquid Fuels Production ("LFP") system. The LFP system converts RWGS product gas into hydrocarbon products, where more than 50 percent of the products are C5 to C24 hydrocarbons. Additionally, one or more C1-C4 hydrocarbons, carbon monoxide and hydrogen are fed into an autothermal reformer ("ATR") that includes a catalyst to provide an ATR product stream. The RWGS product gas is blended with the ATR product stream and fed into a Liquid Fuels Production ("LFP") system to increase the productivity of the system.

4. Water is fed into an electrolysis system powered using renewable electricity to produce hydrogen and oxygen. Carbon dioxide is captured from a source. The carbon dioxide is mixed with the hydrogen from the electrolysis system to form a stream (Reverse Water Gas Shift feedstock or "RWGS" feedstock) that is heated and fed into a RWGS reactor vessel that includes a RWGS catalyst. The RWGS reactor converts the feedstock to an RWGS product gas comprising carbon monoxide, hydrogen, unreacted carbon dioxide and water. A sensor detects that the ratio of hydrogen to carbon dioxide is below 2.5 and sends a signal to a controller which activates a hydrogen recovery module which recovers hydrogen from the RWGS product gas and recycles it to the RWGS reactor. This compensation maintains the ratio of hydrogen and carbon dioxide between 2.0 and 4.0. The RWGS product gas is cooled, compressed, and fed into a Liquid Fuels Production ("LFP") system. The LFP system converts RWGS product gas into hydrocarbon products, where more than 50 percent of the products are C5 to C24 hydrocarbons.

5. Water is fed into an electrolysis system powered using renewable electricity to produce hydrogen and oxygen. Carbon dioxide is captured from a source. The carbon dioxide is mixed with the hydrogen from the electrolysis system to form a stream (Reverse Water Gas Shift feedstock or "RWGS" feedstock) that is heated and fed into a RWGS reactor vessel that includes a RWGS catalyst. The RWGS reactor converts the feedstock to an RWGS product gas comprising carbon monoxide, hydrogen, unreacted carbon dioxide and water. In response to a stimulus of an increase in the cost of renewable electricity, the operating temperature of the RWGS reactor is reduced, thereby consuming less power. This modification alters the product composition from the RWGS reactor. The RWGS product gas is cooled, compressed, and fed into a Liquid Fuels Production ("LFP") system. The LFP system converts RWGS product gas into hydrocarbon products, where more than 50 percent of the products are C5 to C24 hydrocarbons.

6. Water is fed into an electrolysis system powered using renewable electricity to produce hydrogen and oxygen. Carbon dioxide is captured from a source. The carbon dioxide is mixed with the hydrogen from the electrolysis system to form a stream (Reverse Water Gas Shift feedstock or "RWGS" feedstock) that is heated and fed into a RWGS reactor vessel that includes a RWGS catalyst. The RWGS reactor converts the feedstock to an RWGS product gas comprising carbon monoxide, hydrogen, unreacted carbon dioxide and water. In response to a stimulus of a reduced supply of renewable electricity, the amount of power supplied to the electrolysis system is reduced, but the power supplied to other modules of the system is substantially maintained. The RWGS product gas is cooled, compressed, and fed into a Liquid Fuels Production ("LFP") system. The LFP system converts RWGS product gas into hydrocarbon products, where more than 50 percent of the products are C5 to C24 hydrocarbons.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware or with one or more processors programmed using microcode or software to perform the functions recited above.

In this respect, it should be appreciated that one implementation of the embodiments of the present invention comprises at least one non-transitory computer-readable storage medium (e.g., a computer memory, a portable memory, a compact disk, etc.) encoded with a computer program (i.e., a plurality of instructions), which, when executed on a processor, performs the above-discussed functions of the embodiments of the present invention. The computer-readable storage medium can be transportable such that the program stored thereon can be loaded onto any computer resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

Various aspects of the present invention may be used alone, in combination, or in a variety of arrangements not specifically discussed in the embodiments described in the foregoing and are therefore not limited in their application to the details and arrangement of components set forth in the foregoing description or illustrated in the drawings. For example, aspects described in one embodiment may be combined in any manner with aspects described in other embodiments.

Also, embodiments of the invention may be implemented as one or more methods, of which an example has been provided. The acts performed as part of the method(s) may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

The following Examples are for illustrative purposes and are not in any way meant to limit the scope of the invention.

Example 1: This is the base case e-fuels production facility. It is configured as per FIG. 1. Electricity is used in an Electrolysis unit to produce hydrogen. Carbon dioxide is supplied from a Carbon Dioxide capture facility. The hydrogen and carbon dioxide are fed to a RWGS reactor with a $H_2/CO_2$ ratio of 2.0. For this example, if there is a stimulus, this facility responds without the benefit of the invention. The stimulus is a reduction in the amount of electricity available to the e-fuels production facility because of a decrease in wind to the wind turbines. There is a 12-hour period where only 50% of the base electricity is available. The facility electrolysis unit scales back to 50% $H_2$ production; to keep the $H_2/CO_2$ ratio to the RWGS reactor the same, the $CO_2$ usage decreases by 50%; syngas from RWGS reactor decreases by 50%; and therefore, the overall LFP fuel production decreases by 50%. Overall plant revenue decreases by 50% for the 12-hour period. This is clearly less than desired.

Example 2: For this example, the configuration of the facility is similar to the configuration of Example 1 but with a Hydrogen Recovery Module as shown in FIG. 2. In this example, the stimulus is identical to Example 1 where electricity is reduced by 50% for a 12 hour period. The monitor and controller kick in. In this case, the Hydrogen Recovery Module responds to the stimulus by separating $H_2$ from the RWGS reactor outlet which also includes syngas from ATR and recycles $H_2$ back to RWGS inlet to keep $H_2/CO_2$ ratio in the feed the same. $CO_2$ usage stays the same. Water to the ATR is increased resulting in a higher steam to carbon ratio resulting in a higher H2/CO leaving the ATR. The H2/CO ratio to the LFP decreases from 2.0 to 1.8 (say). The overall LFP reactor conversion declines by 20 relative percent from the pre-stimulus base case of Example 1. The overall decrease in product leaving the facility is declined by 20% instead of the 50% decrease of Example 1 and showing the benefit of the invention. Therefore, the overall plant revenue decreases by 20% for the 12-hour period. This represents a substantial improvement in revenue over the bae case.

Example 3: For this example, the configuration is identical to Example 1. The stimulus is a 2 hour cessation of carbon dioxide flow from the carbon capture unit. For this example, in the base configuration, the hydrogen production in the Electrolyzer is ceased. The overall fuel production falls to zero production over that period. The revenue over those two hours falls to zero. The temporary stimulus ceases, and the facility restarts and reaches full production. The facility then receives another stimulus where electricity available falls to zero for 2 hours. The facility then stops production of fuels. The revenue over that two hour period is zero. For this example, over the 4 hours of the two separate stimulus is zero.

Example 4: For this example, the configuration is identical to Example 2 with a Hydrogen Recovery Module. The same stimuli of Example 3 are seen by this new facility. During the first stimulus, there is two hours of no carbon dioxide. In this case, in contrast to Example 3, the operation of the electrolyzer continue. The hydrogen recovery module allows for the liquefaction and storage of the hydrogen produced during the outage. During the second stimulus, where electricity is not available to run the electrolyzer, hydrogen is taken from storage and fuel production continues. In this example, during the first stimulus event, the facility revenue is zero but during the second stimulus event, the revenue does not decline. So in this caseover the two stimulus events, the revenue is 50% of the full production revenue. This represents a substantial increase in revenue versus the facility revenue of Example 4.

REFERENCES

Eichman, J, Koleva, M., Guerra, O. J., McLaughlin, B: Optimizing an integrated renewable-electrolysis system, National Renewable Energy Laboratory Report #NREL/TP-5400-75635, 55 pages (2020).

Ince, C., Hagen, S.: Modeling and simulation of Power-to-X systems: a review, Fuel, 304 (2021).

Wulf, C., Zapp, P., Schrebier, A.: Review of Power-to-X demonstration projects in Europe, Frontiers in Energy Research (2020).

The invention claimed is:

1. A method for controlling a process that produces e-fuels, the method comprising:
  a. providing a first amount of electrical power to an electrolysis module to produce $H_2$, mixing the $H_2$ with $CO_2$ to provide a gas mixture having a first ratio of $H_2$ to $CO_2$, performing a reverse water gas shift reaction on the gas mixture to produce synthesis gas, and reacting the synthesis gas to produce a liquid hydrocarbon, wherein an auto-thermal reforming module reacts $O_2$ from the electrolysis module with unreacted reactants from reacting synthesis gas to produce a liquid hydrocarbon; and b. in response to a stimulus, providing a second amount of electrical power to the electrolysis module to produce $H_2$, mixing the $H_2$ with $CO_2$ to provide a gas mixture having a second ratio of $H_2$ to $CO_2$, performing a reverse water gas shift reaction on the gas mixture to produce synthesis gas, and reacting the synthesis gas to produce a liquid hydrocarbon, wherein an auto-thermal reforming, module reacts $O_2$ from the electrolysis module with unreacted reactants from reacting synthesis gas to produce a liquid hydrocarbon, wherein the second amount of electrical power is an amount between 0 and the amount of electrical power of the first amount, and wherein the second ratio of $H_2$ to $CO_2$ is substantially similar to the first ratio of $H_2$ to $CO_2$.

2. The method of claim 1, wherein the stimulus is associated with an availability of electrical power.

3. The method of claim 1, wherein the stimulus is associated with a price of electrical power.

4. The method of claim 1, wherein the stimulus is associated with an availability of $CO_2$.

5. The method of claim 1, wherein the stimulus is associated with a price of $CO_2$.

6. The method of claim 1, wherein the stimulus is temporary.

7. The method of claim 1, wherein the stimulus lasts for a time between 0 hours and 12 hours.

8. The method of claim 1, wherein, following the stimulus, the first amount of electrical power is provided to the electrolysis module.

9. The method of claim 1, wherein $H_2$ is drawn from a pipeline in response to the stimulus.

10. The method of claim 1, wherein the $H_2$ is produced by the electrolysis module and stored.

11. The method of claim 1, wherein $H_2$ is drawn from storage in response to the stimulus.

12. The method of claim 1, wherein $H_2$ is recovered from a product stream of the reaction of synthesis gas to the liquid hydrocarbon.

13. The method of claim 1, wherein the $H_2$ is recovered using pressure swing adsorption.

14. The method of claim 1, wherein the second amount of electrical power is between 0% and 70% of the first amount of electrical power.

15. The method of claim 1, wherein an amount of electrical power delivered to a reactor performing the water gas shift reaction is reduced by an amount which is between zero and the value of the ratio of the second to the first amounts of electrical power.

16. The method of claim 1, wherein a flowrate of the gas mixture is reduced by at an amount between 20% and 100%.

17. The method of claim 1, wherein the first and/or second amounts of electrical power are derived from renewable resources.

18. The method of claim 1, wherein the liquid hydrocarbon is a fuel.

19. The method of claim 1, wherein the first ratio and the second ratio are between 2.0 and 4.0.

* * * * *